US008186876B2

(12) United States Patent
Mullin et al.

(10) Patent No.: US 8,186,876 B2
(45) Date of Patent: May 29, 2012

(54) CALIBRATED ASSEMBLY FOR IR THERMOMETER APPARATUS

(75) Inventors: Matthew D. Mullin, Memphis, NY (US); Michael J. Anson, Auburn, NY (US); John A. Lane, Weedsport, NY (US); David E. Quinn, Auburn, NY (US); Henry J. Smith, III, Auburn, NY (US); Ray D. Stone, Camillus, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 482 days.

(21) Appl. No.: 12/426,556

(22) Filed: Apr. 20, 2009

(65) Prior Publication Data
US 2010/0265986 A1   Oct. 21, 2010

(51) Int. Cl.
*G01J 5/00* (2006.01)
*G01K 15/00* (2006.01)
(52) U.S. Cl. ............. 374/121; 374/1; 374/2; 374/158; 600/549
(58) Field of Classification Search .............. 374/1, 120, 374/121, 129, 132, 163, 164, 170–172, 208, 374/2, 158, 209; 600/549, 474, 184; 702/130–136, 702/99; 250/338.1
See application file for complete search history.

(56) References Cited

U.S. PATENT DOCUMENTS

| 4,602,642 | A | 7/1986 | O'Hara et al. |
| 4,993,419 | A | 2/1991 | Pompei |
| 4,993,424 | A * | 2/1991 | Suszynski et al. ............ 600/549 |
| 5,167,235 | A * | 12/1992 | Seacord et al. ............... 600/474 |
| RE34,507 | E | 1/1994 | Egawa |
| 5,293,877 | A | 3/1994 | O'Hara |
| 5,325,863 | A | 7/1994 | Pompei |
| 5,368,038 | A | 11/1994 | Fraden |
| 5,645,350 | A | 7/1997 | Jang |
| 5,764,684 | A * | 6/1998 | Pompei ........................ 374/126 |
| 5,820,264 | A | 10/1998 | Tsao |
| 5,857,775 | A | 1/1999 | Vodzak |
| 6,102,564 | A | 8/2000 | Egawa |
| 6,109,782 | A | 8/2000 | Fukura |
| 6,152,595 | A | 11/2000 | Beerwerth |
| 6,156,148 | A | 12/2000 | Beerwerth |
| 6,179,785 | B1 | 1/2001 | Martinosky |
| 6,186,956 | B1 | 2/2001 | McNamee |
| 6,332,090 | B1 | 12/2001 | DeFrank |

(Continued)

OTHER PUBLICATIONS

European Patent Office; International Search Report from PCT/US2010/033080; Oct. 14, 2010.

(Continued)

*Primary Examiner* — Gail Verbitsky

(57) ABSTRACT

A tip assembly for an IR thermometer apparatus includes a heat sink having a heat sink cavity and a tip section and a fluid path and at least one hydraulic port. The tip assembly also includes an IR sensor mechanically seated in the tip section and thermally coupled to the heat sink. The tip assembly also includes an electrical connector configured to provide an electrical connection to the tip assembly. A fluid having a fluid temperature is introduced into the fluid path via the hydraulic port. The fluid causes the heat sink and the IR sensor to substantially reach one or more pre-determined temperatures by thermal conduction during calibration of the tip assembly. Another tip assembly having an internal heat source is described. Another tip assembly having an internal heat pump is described. A method to calibrate a tip assembly is also described.

37 Claims, 8 Drawing Sheets

U.S. PATENT DOCUMENTS

| | | | |
|---|---|---|---|
| 6,416,602 B1 | 7/2002 | Firatli | |
| 6,572,264 B1 | 6/2003 | Egawa | |
| 6,631,287 B2 | 10/2003 | Newman | |
| 6,634,787 B1 | 10/2003 | Beerwerth | |
| 6,694,174 B2 | 2/2004 | Kraus | |
| 6,695,474 B2 | 2/2004 | Beerwerth | |
| 6,749,334 B2 | 6/2004 | Lin | |
| 6,821,016 B2 | 11/2004 | Sato | |
| 6,991,368 B2 | 1/2006 | Gerlitz | |
| 7,048,437 B2 | 5/2006 | Bellifernine | |
| 7,121,720 B2 | 10/2006 | Beerwerth | |
| 7,237,949 B2 | 7/2007 | Lantz | |
| 7,275,867 B2 | 10/2007 | Lee | |
| 7,329,044 B2 | 2/2008 | Sato | |
| 7,841,767 B2 * | 11/2010 | Harr | 374/121 |
| 7,988,352 B2 * | 8/2011 | Lin et al. | 374/121 |
| 2002/0163953 A1 | 11/2002 | Yu | |
| 2002/0176479 A1 | 11/2002 | Hur | |
| 2002/0186745 A1 | 12/2002 | Pompei | |
| 2002/0191670 A1 | 12/2002 | Huang | |
| 2003/0016728 A1 | 1/2003 | Gerlitz | |
| 2003/0067957 A1 | 4/2003 | Ko | |
| 2003/0074155 A1 * | 4/2003 | Ota | 702/134 |
| 2004/0013162 A1 | 1/2004 | Beerwerth | |
| 2004/0028116 A1 | 2/2004 | Lin | |
| 2004/0228386 A1 | 11/2004 | Tabata | |
| 2005/0002437 A1 | 1/2005 | Fraden | |
| 2006/0050769 A1 | 3/2006 | Lee | |
| 2006/0062274 A1 | 3/2006 | Pompei | |
| 2006/0153278 A1 | 7/2006 | Chen | |
| 2006/0198424 A1 | 9/2006 | Chen | |
| 2006/0215728 A1 | 9/2006 | Jang | |
| 2006/0239329 A1 | 10/2006 | Tanaka | |
| 2006/0239332 A1 | 10/2006 | Harr | |
| 2007/0127545 A1 | 6/2007 | Lee | |
| 2007/0206657 A1 | 9/2007 | Lin | |
| 2007/0206675 A1 | 9/2007 | Tanaka | |
| 2007/0211783 A1 | 9/2007 | Huang | |
| 2008/0267254 A1 * | 10/2008 | Hsieh | 374/121 |
| 2011/0134962 A1 * | 6/2011 | Fraden | 374/209 |

OTHER PUBLICATIONS

International Search Report for PCT/US2010/031035, mailed Jun. 30, 2010 (9 pages).

* cited by examiner

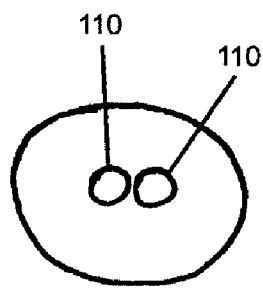
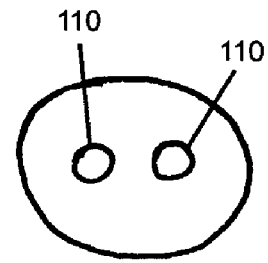
FIG. 1A  FIG. 1B
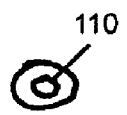
FIG. 1C
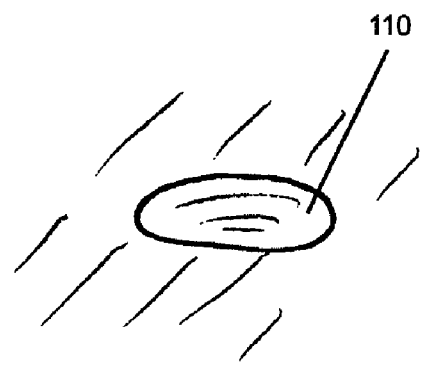
FIG. 1D
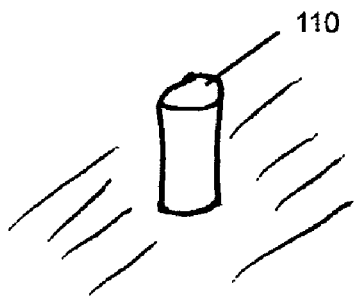
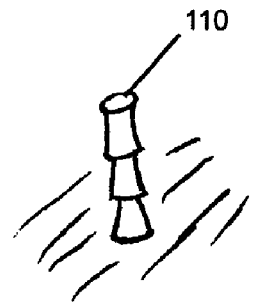
FIG. 1E  FIG. 1F

CALIBRATED ASSEMBLY FOR IR THERMOMETER APPARATUS

FIELD OF THE INVENTION

This invention relates generally to a tip assembly and more specifically to a calibrated IR tip assembly for an IR thermometer.

BACKGROUND OF THE INVENTION

Non-contact IR thermometers are in wide use today. By viewing IR radiation emitted from a surface, a non-contact IR thermometer measures the temperature of that surface from a distance. For example, clinicians in medical clinical settings find IR ear thermometers, which measure the temperature of the tympanic membrane, especially convenient for taking the temperature of a patient.

Manufacturers of IR thermometers spend a considerable amount of time calibrating IR thermometers after final assembly. This calibration typically involves setting calibration constants for each instrument at a given set of instrument and IR calibration target temperatures. For example, it can take hours to "heat soak" a rack of instruments being calibrated after final assembly, in part, because a substantial part of the body of an IR thermometer is often constructed from a thermally insulating material, such as a plastic. Such time consuming calibration procedures can limit the number of instruments that can be produced by a manufacturer and increase capital equipment requirements.

One calibration problem with IR thermometers, particularly those using thermopile IR sensors, is that there are errors in the temperature readings related to the case temperature of the internal IR sensor. The IR sensor case temperature can be affected, for example, by heat flow from the outside environment into the typically plastic outer case or the tip shroud of an IR ear thermometer. Other errors or calibration factors include IR viewing angles through an assembled tip, IR transparency of an outer optical window, and rates of temperature rise for various heat flows and heat flow paths from the environment through the various types of materials present in an assembled IR thermometer. Some such environmental influences, unique to the mechanical and thermal design of each instrument, are taken into account during the typically lengthy calibration of each assembled IR thermometer.

One IR sensor useful for IR thermometer applications includes an internal electronics circuit that can provide some calibration information for the sensor itself. Unfortunately, a small "calibrated" IR sensor part cannot create a calibrated IR thermometer, since a "calibrated" sensor alone does not take into account the actual mechanical and thermal structure of the finally assembled IR thermometer. Building an IR thermometer with such a sensor does not result in a calibrated IR thermometer. Therefore, an IR thermometer built with a "calibrated" IR sensor typically still requires a lengthy final calibration adjustment procedure.

What is needed, therefore, is a tip assembly that can be fully calibrated such that when assembled onto another instrument section, such as an IR thermometer body, no further initial calibration is needed.

SUMMARY OF THE INVENTION

According to one aspect, a tip assembly for an IR thermometer apparatus includes a heat sink having a heat sink cavity. A tip section has a fluid path defined within the tip section and at least one hydraulic port. An IR sensor is disposed within the tip section and thermally coupled to the heat sink. A shroud overlays at least the tip section. An electrical connector is configured to provide electrical coupling to an electronic circuit disposed within the tip assembly. A fluid having a fluid temperature is introduced into the defined fluid path via the at least one hydraulic port, and the fluid causes the heat sink and the IR sensor to substantially reach one or more pre-determined temperatures by thermal conduction during calibration of the tip assembly. The fluid is substantially removed following calibration.

The defined fluid path can assume several forms such as a hydraulic channel or an air gap, or this path can be disposed between the heat sink and the shroud.

In yet another embodiment, the at least one hydraulic port includes both an inflow connection and an outflow connection configured to allow a fluid flow through the fluid path.

For example, the heat sink can include two hydraulic ports, wherein a first hydraulic port is configured for fluid inflow and a second hydraulic port is configured for fluid outflow to create a fluid flow through the fluid path and the first hydraulic port and the second hydraulic port are interchangeable for fluid inflow or outflow.

In yet another embodiment, the heat sink is thermally isolated from the shroud by at least one air gap.

In yet another embodiment, the tip assembly further includes a memory communicatively coupled to the electrical connector.

In yet another embodiment, the memory includes an EEPROM.

In yet another embodiment, the IR thermometer apparatus is configured such that at least once, before a temperature measurement made by the IR thermometer apparatus the calibration coefficients are read from the memory of the tip assembly via the electrical connector by an algorithm running on a microcomputer circuit disposed within the IR thermometer apparatus.

In yet another embodiment, the tip assembly further includes an electronics circuit electrically coupled to the IR sensor, the electronics circuit including an amplifier to amplify an IR sensor signal from the IR sensor, an analog to digital converter (ADC) electrically coupled to the amplifier and configured to digitize an amplified IR sensor signal and to provide an output via the electrical connector.

In yet another embodiment, the amplifier and the ADC are both disposed on a common integrated circuit.

In yet another embodiment, the tip assembly further includes a microcomputer resident within the tip assembly wherein the tip assembly is configured such that at least once, the calibration coefficients are read from the memory of the tip assembly by an algorithm running on the tip assembly microcomputer circuit during a measurement and the tip assembly outputs a digital value corrected by the calibration coefficients via the electrical connector.

In yet another embodiment, the electronic circuit includes a voltage reference configured to be electrically coupled to the ADC via an electronic switch to calibrate the ADC in response to a control signal sent to the tip assembly via the electrical connector.

In yet another embodiment, the microcomputer and the ADC are both disposed on a common integrated circuit.

In yet another embodiment, the IR sensor includes a thermopile.

In yet another embodiment, the tip assembly includes a threaded portion enabling attachment to attach to the IR thermometer apparatus by mechanical threads.

In yet another embodiment, the tip assembly includes a slide and latch mechanism.

In yet another embodiment, the tip assembly is mechanically configured to attach to the IR thermometer apparatus by at least one flange and screw.

In yet another embodiment, the tip assembly includes a liquid tight housing.

In yet another embodiment, the tip assembly includes a cover detection mechanism to detect attachment of a calibration cover.

In yet another embodiment, the calibration cover includes a highly reflective (HR) surface disposed over a window of the IR sensor.

In yet another embodiment, the tip assembly includes a heating element electrically configured to be heated to a pre-determined temperature on detection of placement of the calibration cover on the tip assembly, and wherein the HR surface reflects IR radiation from the heating element and the received IR radiation is used as a calibration check of the tip assembly.

In yet another embodiment, the calibration check is out of pre-determined limits, the calibration coefficients are updated and stored in a memory disposed within the tip assembly.

In yet another embodiment, the heating element includes a thermistor.

In yet another embodiment, the thermistor is configured to be used for measuring a heat sink temperature of the IR sensor during a normal operation of the tip assembly, and as a heating element used for calibration during a calibration check of the tip assembly.

In one embodiment, the cover detection mechanism detects attachment of the calibration cover by means of at least one of electro-mechanical switch, electro-optical cover detection, and capacitive cover detection.

In yet another embodiment, the calibration coefficients are calculated by an external test fixture and written into the memory of the tip assembly during a calibration process.

In yet another embodiment, the tip assembly further includes an embedded microcomputer.

In yet another embodiment, the calibration coefficients are calculated by the embedded microcomputer and written into a memory during a calibration process.

According to another aspect, a tip assembly for an IR thermometer apparatus includes a tip section and a heat sink. A heating element is thermally coupled to the heat sink. An IR sensor is mechanically seated in a tip section of the tip assembly and thermally coupled to the heat sink. A shroud mechanically covers at least a portion of the tip section. An electrical connector is configured to provide electrical coupling to an electronic circuit disposed within the tip assembly. The temperature of the heat sink and the IR sensor are set to one or more pre-determined temperatures by heating caused by the heating element during calibration of the tip assembly.

According to another aspect, a tip assembly for an IR thermometer apparatus includes a heat sink having a heat sink cavity. A heat pump is thermally coupled to the heat sink. An IR sensor is mechanically seated in a tip section of the tip assembly and thermally coupled to the heat sink. A shroud is mechanically covering at least a portion of the tip section. An electrical connector is configured to provide electrical coupling to an electronic circuit disposed within the tip assembly. The temperature of the heat sink and the IR sensor is set to one or more pre-determined temperatures by heating or cooling as caused by the heat pump during calibration of the tip assembly.

In one embodiment, the heating element includes a thermoelectric heat pump and wherein a temperature of the heat sink and the IR sensor is set to one or more pre-determined temperatures by heating or cooling caused by the thermoelectric heat pump during calibration of the tip assembly.

In yet another embodiment, an IR thermometer includes a calibrated tip assembly as described above. A microcomputer circuit is communicatively coupled to the calibrated tip assembly via the electrical connector. The microcomputer circuit runs an algorithm configured to receive a digital signal representing a measured temperature and to communicate with the memory to read one or more calibration coefficients and to output a measured temperature. The IR thermometer is defined by an IR thermometer housing. The calibrated tip assembly is releasably attached to the IR thermometer housing. The entire IR thermometer is in a calibrated state following attachment of the calibrated tip assembly.

In one embodiment, the microcomputer circuit is configured to output the measured temperature via at least one of a human readable display, a wired data connection, and a wireless data connection.

According to another aspect, a method to calibrate a tip assembly, the method including the steps of: providing a tip assembly to be calibrated, the tip assembly including an IR sensor, a heat sink thermally coupled to the IR sensor, and at least one fluid path disposed within the tip assembly; flowing a fluid at a pre-determined temperature though the at least one fluid path while the IR sensor is viewing a calibrated temperature target at a pre-determined target temperature to obtain a calibration data point; repeating the flowing step one or more times; calculating a set of calibration coefficients from two or more data points to calibrate the tip assembly; and storing the set of calibration coefficients on a recordable media.

In one embodiment, the providing step includes the step of providing a tip assembly wherein the at least one fluid path disposed within the tip assembly includes a fluid channel.

In another embodiment, the providing step includes the step of providing a tip assembly wherein the at least one fluid path disposed within the tip assembly includes an air gap channel disposed between the heat sink and a tip shroud.

In yet another embodiment, the step of storing the calibration coefficients includes the step of storing the calibration coefficients on a memory.

In yet another embodiment, the tip assembly is a liquid tight tip assembly and during the flowing step, the tip assembly is further submerged in a liquid.

According to another aspect, there is provided a method to releasably attach a tip assembly, the method including the steps of: providing a tip assembly to be releasably attached to an apparatus for calibration, the tip assembly including an IR sensor, a heat sink thermally coupled to the IR sensor, and at least one fluid path disposed within the tip assembly; attaching the tip assembly to the apparatus; and releasing the tip assembly from the apparatus for a selected one of cleaning the tip assembly, replacing the tip assembly, and calibrating the tip assembly.

In one embodiment, the attaching step further includes the step of attaching a disposable cover to a tip section of the tip assembly.

BRIEF DESCRIPTION OF THE DRAWINGS

For a further understanding of these and objects of the invention, reference will be made to the following Detailed Description, which is to be read in connection with the accompanying drawings, where:

FIG. 1A shows an exemplary hydraulic port having a dual hose connection;

FIG. 1B shows an exemplary hydraulic port having two separate hose connections;

FIG. 1C shows two hydraulic ports, each having a single hose connection;

FIG. 1D shows an exemplary hydraulic port having a single hose or pipe connection recessed in a surface of a tip assembly;

FIG. 1E shows an exemplary hydraulic port having single pipe extension such as for a flexible hose or tubing connection;

FIG. 1F shows an exemplary hydraulic port having single barbed pipe extension suitable for a flexible tubing connection;

The drawings are not necessarily to scale, emphasis instead generally being placed upon illustrating the principles of the invention. In the drawings, like numerals are used to indicate like parts throughout the various views.

DETAILED DESCRIPTION

For purposes of the following discussion, the term "microcomputer" is defined herein as synonymous with microprocessor, microcontroller, and digital signal processor ("DSP"). It is understood that memory used by the microcomputer, including for example tip assembly monitor "firmware", can reside in memory physically inside of a microcomputer chip or in memory external to the microcomputer or in a combination of internal and external memory. Similarly, analog signals can be digitized by one or more stand alone analog to digital converters ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Tip assemblies having any of the inventive features described herein can operate entirely on one microcomputer or can include more than one microcomputer.

Also, for purposes of the following discussion, the term "electrical connector" is defined herein to include any suitable releasable electro-mechanical connection. For example, an electrical connector can include a conventional connector having a plastic and/or metal shell and/or metal contact pins (plugs or jacks). Or, an electrical connector is also understood to include, for example, a stripped ribbon cable end that can be releasably attached to another apparatus. For example, a semi-rigid ribbon cable can be stripped or partially stripped at one end so as to be releasably inserted into receiving electrical connection points such as slots or fingers.

Figure 1:
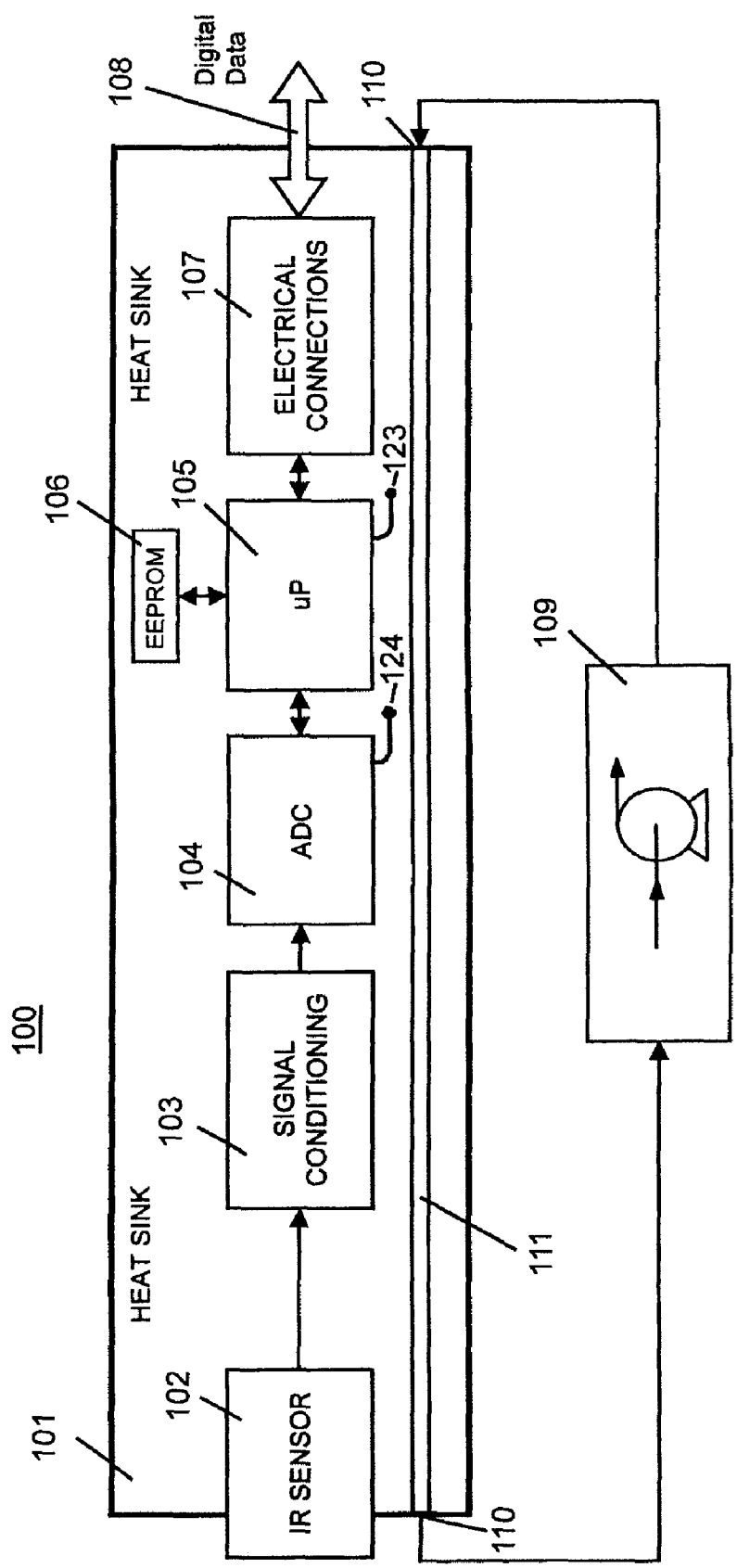
FIG. 1 shows a block diagram of one exemplary embodiment of a tip assembly.

FIG. 1 shows a block diagram of one exemplary embodiment of a tip assembly for an IR thermometer that can be fully calibrated, i.e., when assembled onto an IR thermometer body, no further calibration of the thermometer is needed. The tip assembly for an IR thermometer apparatus as represented by the block diagram of FIG. 1 includes a heat sink 101. In the embodiment of FIG. 1, a fluid path is defined by a hydraulic channel 111 and a pair of hydraulic ports 110. In some embodiments, such as the embodiment of FIG. 1, the fluid path can be defined exclusively through the heat sink 101. In other embodiments, as described herein below, a fluid flow can be maintained through other parts of the tip assembly, such as a cavity in a heat sink 101 (not shown in FIG. 1). Hydraulic ports 110 typically include a fluid input connection and a fluid output connection to establish a fluid flow through the heat sink 101.

FIG. 1A to FIG. 1F show several exemplary embodiments suitable for use as the hydraulic ports of the block diagram of FIG. 1. FIG. 1A shows two co-located hydraulic ports 110 having a dual hose connection. FIG. 1B shows exemplary hydraulic ports 110 suitable for use with two separate hoses or pipes (not shown in FIG. 1B). FIG. 1C shows two hydraulic ports 110, each suitable to accept a single hose (not shown in FIG. 1C). FIG. 1D shows an exemplary hydraulic port 110 recessed in a surface of a tip assembly 100 suitable for use with a single hose or pipe (not shown in FIG. 1D). FIG. 1E shows an exemplary hydraulic port 110 having single pipe extension such as to receive a flexible hose or tubing connection (not shown in FIG. 1E). FIG. 1F shows an exemplary hydraulic port 110 having single barbed pipe extension such as to receive a flexible tubing (not shown in FIG. 1F).

Referring back to FIG. 1, and in order to calibrate the tip assembly 100, a fluid having a fluid temperature is introduced into hydraulic channel 111 via hydraulic port 110. The fluid can, for example, be sourced during calibration from a reservoir and pump 109 external to, and not part of the tip assembly 100. Any suitable fluid, such as water (e.g. distilled water), can be used. The fluid causes heat sink 101 and IR sensor 102, which is thermally coupled to heat sink 101, to substantially reach one or more pre-determined temperatures by thermal conduction during calibration of the tip assembly 100. The flow of the temperature controlled fluid allows heat sink 101 and sensor 102 to reach an "ambient" calibration temperature in relatively quick fashion. When a tip assembly 100 is simultaneously viewing an IR thermal calibration target at a known IR thermal calibration target temperature, a calibration point can be established. Typically, two or more calibration points can be used to calculate a set of calibration coefficients for each tip assembly 100.

As discussed above, the tip assembly 100 can have at least one hydraulic port which includes both an inflow port and an outflow connection configured to allow a fluid flow through a hydraulic channel 111. Or, a heat sink 101 of a tip assembly 100 can have two hydraulic ports. A first port can be configured for fluid inflow and the second port for fluid outflow to create a fluid flow through a hydraulic channel 111. In most embodiments, the direction of fluid flow through the hydraulic channel 111 is nonessential.

Alternatively, a suitable fluid path can exist through an air gap. One example of a suitable air path is an air gap which in normal operation of a tip assembly provides a thermal insulation between a tip assembly 100 and an overlaying shroud (not shown in FIG. 1; see for example air gap 305 in the example illustrated in FIG. 2 which is described in more detail below).

Referring back to FIG. 1, at each calibration point, an electrical output from the IR sensor 102, typically a thermopile, can be filtered and/or amplified by signal conditioning block 103, then digitized by an analog to digital converter (ADC) 104. A microcomputer 105 can receive digitized data from ADC 104, which represents the signal from signal conditioning block 103. Microcomputer 105 can also transfer the digitized data, either directly or after further digital processing, as a digital output from the tip assembly 100 over a digital bus 108 via electrical connections 107. An electrical connection 107 can be provided by, for example, by a ribbon cable. A ribbon cable can typically be mechanically coupled to a tip assembly 100, such as by a mechanical clamp and/or an epoxy (not shown in FIG. 1). An epoxy can also be used to create a liquid tight tip assembly. A ribbon cable can have a ribbon cable connector, or a semi-flexible, or semi-rigid ribbon cable, can have exposed electrical contact "fingers" that can directly plug into a suitable mating receptacle. It is understood herein that anywhere there are one or more electrical connections 107, there is also a releasable electro-mechanical connection (an electrical connector).

In one embodiment an external computer (not shown) calculates a set of calibration coefficients for each tip assembly 100. In such embodiments using an external computer, tip assembly 100 can be set to a calibration mode, such as commanded via electrical connections 107, and microcomputer 105 can run a calibration algorithm from firmware which causes an output of "un-calibrated" or un-corrected "raw" digital data at each combination of heat sink 101 temperature (as set by a fluid flow) and sensed temperature of an IR target as optically viewed by IR sensor 102. It is unimportant whether the command to enter a calibration mode is introduced by a dedicated contact (e.g. a dedicated wire or line) of electrical connections 107 or by a digital command sequence or word input to microcomputer 105 via digital data bus 108. After calibration, the fluid (not shown in FIG. 1) can be substantially removed. Also, calibration coefficients calculated during the calibration, such as calculated by the external computer above, can be up-loaded to each calibrated tip assembly 100, such as, for example, via digital data bus 108 accessible via electrical connections 107. The set of calibration coefficients can be stored in any suitable memory disposed in a tip assembly 100, such as EEPROM 106 (FIG. 1) or a suitable non-volatile memory of microcomputer 105.

In some embodiments, microcomputer 105 can receive information of the heat sink 101 temperature from a temperature sensor 123 thermally coupled to heat sink 101 and electrically coupled to microcomputer 105 (where a microcomputer 105 has an input connection suitable for a temperature sensor). Where a microcomputer 105 has an internal ADC, temperature sensor 123 can be any type of suitable analog temperature sensor, or temperature sensor 123 can include an internal ADC and the temperature sensor can be in digital communications with microcomputer 105. In other embodiments, ADC 104 can be a multichannel ADC having an input for a temperature sensor 124 to determine the temperature of heat sink 101. Exemplary suitable analog temperature sensors include thermistors, RTDs, and thermocouples. Exemplary digital temperature sensors (such as are suitable for temperature sensors 123 and 124) include one and two wire digital temperature sensors such as, for example, are commercially available from Maxim (of Sunnyvale, Calif.), Analog Devices Incorporated (of Norwood, Mass.), and Texas Instruments (of Dallas, Tex.).

Following calibration, the tip assembly 100 can be mounted onto an IR instrument assembly, such as an IR ear thermometer body or an IR probe for a medical monitor wherein the instrument assembly can then be used without further instrument calibration to commence patient measurements. As noted in the preceding, an IR tip assembly also includes an overlaying shroud that can help to thermally insulate both the heat sink 101 and the IR sensor 102 from ambient heat sources and sinks outside of the IR instrument. The shroud can be fabricated from a thermally insulative material, such as for example, a plastic or from a thermally conductive material, such as a metal. The shroud is attached to the tip assembly 100, in an overlying fashion. In some embodiments there can also be one or more thermally insulative air gaps between the shroud and the tip assembly 100.

Following installation of tip assembly onto or into a corresponding IR instrument, e.g. an IR ear thermometer, and before a temperature measurement made by the IR thermometer, calibration coefficients can be read from a memory (e.g. EEPROM 106, FIG. 1) of tip assembly 100 via the electrical connections 107, FIG. 1, of the tip assembly by a means of an algorithm running on a microcomputer circuit disposed within the IR thermometer apparatus. Alternatively the IR tip assembly 100 can be set to an operational mode (as opposed to a calibration mode) where at each reading, an algorithm running on microcomputer 105 uses the calibration coefficients so that, for example, each temperature digitally output on digital data bus 108 via electrical connector 107 is an actual temperature (already corrected using the calibration coefficients determined at calibration of the tip assembly 100). Thus, a tip assembly 100 can be configured such that at least once before a temperature measurement is made by an IR thermometer apparatus (to which the tip assembly 100 is affixed) the calibration coefficients stored on a memory of the tip assembly 100 (e.g. EEPROM 106) can be input to an algorithm running on microcomputer 105, or another microcomputer external to assembly, to correct each "raw" reading from an IR sensor 102 during each temperature measurement. The algorithm can also have as input a temperature of heat sink 101, such as can be obtained from a temperature sensor 123, or 124 (FIG. 1).

While in the exemplary embodiment of FIG. 1 there are shown separate electronic function blocks, there is no need for physically separate electronic circuits to perform each function. For example, as will be seen in the examples below, signal conditioning block 103, ADC 104, microcomputer 105, and EEPROM 106 can be combined in one common monolithic or hybrid integrated circuit. Or, for still further integration, there can be a sensor "can", which includes an IR sensor 102 as well as components such as signal conditioning block 103, ADC 104, microcomputer 105, and EEPROM 106.

Tip calibration as described thus far, has concerned determination of the temperature of an IR target as optically viewed by an IR sensor 102 for various heat sink 101 temperatures. Another potential source of error is the calibration of the ADC 104. In some embodiments, the tip assembly 100 can be configured to allow a test signal, such as a known test voltage, to be applied to ADC 104 to determine calibration coefficients for the ADC 104. For example, momentarily connecting the ADC 104 input to an electronics common, and then to a known test voltage, can establish both slope and offset calibration values for the ADC 104. Alternatively, the known test voltage alone can be used to determine a gain value (slope) for the ADC, assuming ADC 104 offset remains within a desired range over the life of the tip assembly 100. In some embodiments, a tip assembly 100 can include an internal voltage reference to generate the known test voltage. In such embodiments, the analog input to an ADC 104 or signal conditioning 103 block can be remotely commanded between the signal derived from IR sensor 102 and the voltage reference (not shown in FIG. 1) to calibrate ADC 104. Such a remote command can be achieved either by a dedicated contact (e.g. a dedicated wire or line) of electrical connections 107 or by a digital command sequence or word input to microcomputer 105 via digital data bus 108.

A tip assembly, as described above, can be affixed to the body of an IR ear thermometer, or to create a complete functional monitor including, for example, a calibrated IR ear thermometer. Any suitable mounting means can be used to mechanically couple a tip assembly to another apparatus (e.g. the IR ear thermometer body). For example, the tip assembly can include a proximal end having a set of internal or external threads sized to engage the distal end of another threaded portion of an IR ear thermometer or other apparatus. In one version, the ear thermometer includes a threaded collar that can be turned to secure the assembly to the device, thus substantially preventing a winding of the electrical leads and/or one or more ribbon cables that electrically couple the tip assembly to the apparatus. In other embodiments, a suitably flexible electrical connection, such as a ribbon cable or rotating connector or contact mechanism can be allowed to twist on assembly. Or, a tip assembly can include a longitudinal protrusion having a cylindrical, rectangular, or square configuration that can slide into a corresponding mechanical receptacle provided on another mechanical apparatus (e.g. a thermometer body). Typically where a tip assembly releasably slides onto or into another apparatus, there can also be a mechanical latch or latching mechanism so the tip assembly does not become accidentally separated from the other apparatus. Alternatively, a mechanical flange (e.g. a substantially orthogonal flat section, such as a mounting flange) with a hole can accept a fastener to mechanically affix a tip assembly to another apparatus. Both the tip assembly and the mechanical apparatus can have flanges, or only one of the tip assembly or other apparatus can have flanges that are bolted to a suitable surface on the other. Note that in all of the above embodiments, wherever there is a mechanical plug and receptacle mating arrangement, it is unimportant whether the plug is provided on the tip assembly or on the mechanical apparatus receiving a tip assembly. In another embodiment a sliding portion of a tip assembly can further include nubs, such as small cylindrical protrusions, that can slidingly engage slots in a mating body to create a bayonet type connection, such as a typical bayonet type connection having a locking feature (e.g. insert, twist, and lock). The small cylindrical protrusions for a bayonet engagement can also serve as the one or more hydraulic ports. Such protrusions can perform a dual function, both as a hydraulic connection and as a mechanical guide (e.g. nubs of a bayonet connection).

One of the advantages of a tip assembly, as described herein is that it can be releasably joined or attached to another mechanical apparatus. Thus, the tip assembly can be removed and replaced as needed with no impact on the instrument's calibration. For example, an inoperative tip assembly can be removed, for replacement by a working (pre-calibrated) tip assembly, or, a tip assembly can be removed for cleaning, such as between patient examinations. The tip assembly can be periodically removed for re-calibration under an instrument calibration protocol, such as for an annual or bi-annual calibration or other purposes.

Heat sink 101, FIG. 1, can typically be manufactured from a material having a relatively high heat capacity, including metals such as aluminum, copper, and any other suitable metals and alloys. Generally, a tip assembly can be made to be partially or completely liquid tight. For example, in embodiments having one or more fluid channels, at least the fluid paths are typically sealed to prevent fluid from reaching, for example, some of the electronic components. In some embodiments, the entire tip assembly can be made liquid tight. One advantage to a fully liquid tight tip assembly is that it can be submerged in a temperature controlled fluid during a calibration procedure. In such calibration procedures, there can also be established a fluid free viewing path between an IR sensor of the tip assembly and a temperature controlled IR target. For example, a window can be at or above the surface of the calibration temperature bath viewing an IR target out of the water. Or, there can be a submerged fluid tight viewing path (e.g. tube) between the window of a tip assembly and an IR calibration target. Another advantage of a liquid tight tip assembly is that it can keep out foreign matter, including human body or animal related substances and fluids or particulates.

As described above, a tip assembly is generally calibrated at the time of manufacture, following a repair, and/or as many times as desired, such as under a scheduled calibration regimen or protocol. Such calibration events can be performed as described above, by providing a fluid flow of a temperature controlled fluid (e.g. water) to set generally two or more tip assembly heat sink temperatures while the IR sensor of the tip assembly is viewing an IR target temperature at one or more pre-selected IR calibration (e.g. black body) temperatures. In other embodiments, such fluid based calibrations can be done by submerging the tip assembly in whole or part in a fluid while an IR target is viewed by the contained IR sensor.

Most tip assemblies are used in the field with a disposable cover or speculum placed over the shroud of the tip assembly, typically a nozzle shape, such as can partially fit into a human or animal ear. Such disposable covers are primarily used to prevent cross-contamination between patients. In some embodiments, there can be a "calibration cover" having the same general shape as a disposable cover, and which can slide onto the shroud of a tip assembly. A calibration cover can be used to check the calibration and/or field calibrate a tip assembly while it is attached to another instrument section (e.g. as affixed to an IR thermometer body and configured as an IR ear thermometer). A tip assembly can include a calibration cover detection mechanism that can detect the presence of such a calibration cover. In one embodiment, a calibration cover can include a highly reflective (HR) surface which, on attachment of the calibration cover, is disposed over the IR window of the tip assembly. The tip assembly can further include a heating element that is electrically configured to be heated to a pre-determined temperature on detection of placement of the calibration cover on the tip assembly. The HR surface of the calibration cover can then reflect the IR radiation received from the heating element in the tip assembly back into the window of the tip assembly. The received IR radiation (reflected back into the tip assembly) can then be used as a calibration check of the tip assembly. In some embodiments, if the calibration check made with a calibration cover is out of a set of pre-determined limits, the calibration coefficients can be updated and stored in a memory disposed within the tip assembly (where local calibration protocols allow such a field calibration). Or, if such field calibrations are precluded by a local calibration policy or protocol, the tip assembly can be replaced and the original out-of-limits tip assembly can be sent back to a tip assembly calibration facility for re-calibration and/or repair.

In embodiments having an internal heating element used in conjunction with a calibration cover, one such suitable heating element is a thermistor. While most commonly used as a temperature sensor, a thermistor can also be heated above an ambient temperature by passing a current through it. One advantage to using a thermistor as the heating element for use with a calibration cover is that the same thermistor can serve other functions during normal instrument use. For example, the same thermistor can also be used as temperature sensor to measure the temperature of the heat sink during normal instrument operation. Then, when a calibration cover is attached and the instrument detects the presence of a calibration cover, or is otherwise commanded (e.g. by a button sequence) into a field calibration mode, the thermistor temperature can be read and then the thermistor can be heated as a local IR black body calibration source (the thermistor (heat sink) temperature can also be read after the thermistor cools, following the heated part of a calibration check).

Tip assemblies which can be calibrated, or calibration checked, with a calibration cover can also be configured to automatically detect the presence of a calibration cover. For example, a unique physical feature at a pre-determined position on a calibration cover can be provided to cause an electro-mechanical switch in a tip assembly to change state. Alternatively, an optical feature, such as a dark or reflective spot on a calibration cover, can be detected by an electro-optical device provided in the tip assembly. In other embodiments, the presence of a calibration cover can be detected by a capacitive sensor within the tip assembly. Such calibration cover capacitive features can include, for example, a cover material having a certain permittivity, or a section of conductor or conductive film separated from the tip assembly by an insulator.

EXAMPLES

Figure 2:
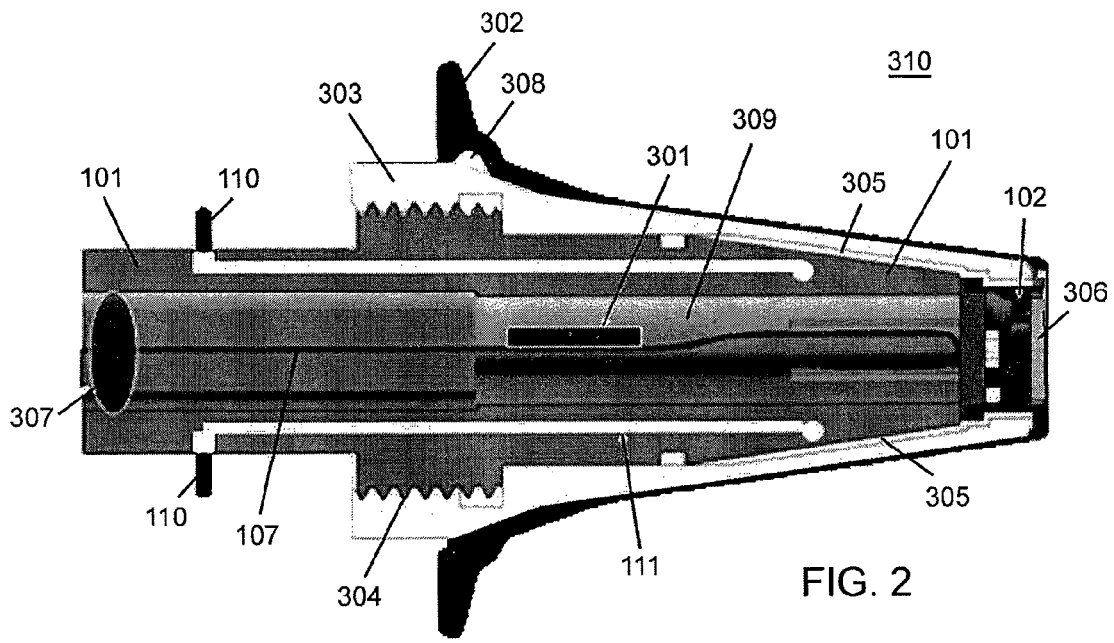
FIG. 2 shows a cutaway drawing of one exemplary embodiment of a tip assembly with a disposable cover affixed to the tip assembly.

FIG. 2 shows a cutaway drawing of one exemplary embodiment of a tip assembly 310 having a disposable (speculum) cover 302. This tip assembly 310 has been configured for calibration by a temperature controlled fluid flow as described above. A circuit assembly 301 can be disposed within a cavity of the heat sink 101. A fluid can be flowed through ports 110 and channel 111. Note that a portion of the path of channel 111 (e.g. a circular, elliptical, or annular path) near the forward section of heat sink 101 is not visible in the cutaway drawing of FIG. 2. Also note that in the embodiment of FIG. 2, the fluid flow is limited to the channel 111 of heat sink 101 and does not enter the cavity 309 of heat sink 101. In other embodiments, there can be additional fluid flow into and through cavity 309, in which case, circuit assembly 301 can be made to be substantially fluid tight (e.g. water resistant or waterproof). Circuit assembly 301 can include signal conditioning block 103, ADC 104, microcomputer 105, and the EEPROM 106 of FIG. 1. Electrical connections 107 (FIG. 1) can be made via ribbon cable or other suitable arrangement of wires, for example, via a fluid seal 307. A shroud 303 can be fabricated from an insulating material, such as a plastic or from a thermally conductive material, such as a metal. Shroud 303 can also be used to create additional insulating air gaps 305 between the shroud 303 and heat sink 101. A shroud 303 according to this embodiment includes a set of threads 304 that can engage a corresponding set of threads provided on the tip assembly 310 as well as a locking feature 308 which can accept and retain a disposable cover 302. In this instance, the locking feature 308 is an annular shoulder which engages a slot formed on the interior surface of the disposable cover 302, which according to this embodiment is made from a frusto-conical conical configuration and includes an open distal end. An optical window 306 disposed on the distal end of the assembly 310 can provide additional fluid sealing for tip assembly 310. An optical window 306 can be either a separate optical window, or alternatively, part of an IR sensor 102 assembly (typically, an IR sensor "can" with a window).

Figure 3:
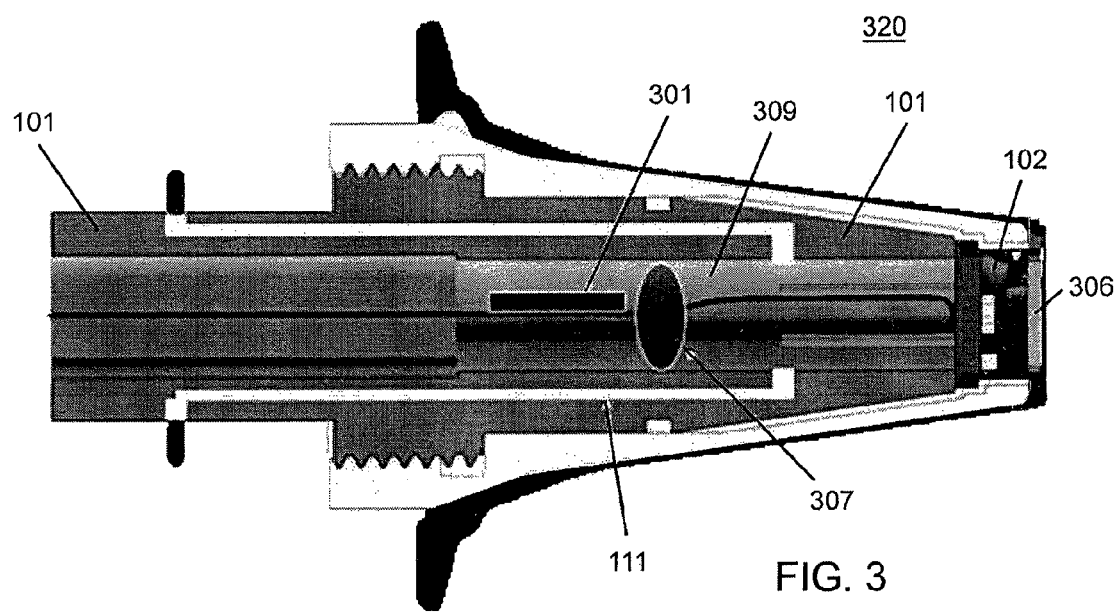
FIG. 3 shows another exemplary embodiment of a tip assembly where a fluid seal is disposed in a forward location.

FIG. 3 shows another embodiment of a tip assembly 320 which is substantially similar to the embodiment shown in FIG. 2, except the fluid seal 307 has been moved forward (i.e. closer to the distal end). In the embodiment of FIG. 3, fluid can freely circulate through a portion of a cavity 309 in heat sink 101, such as including the section behind and in thermal contact with IR sensor 102. Here, circuit assembly 301 is seen to be behind fluid seal 307 and not directly in a path of fluid flow.

Figure 4:
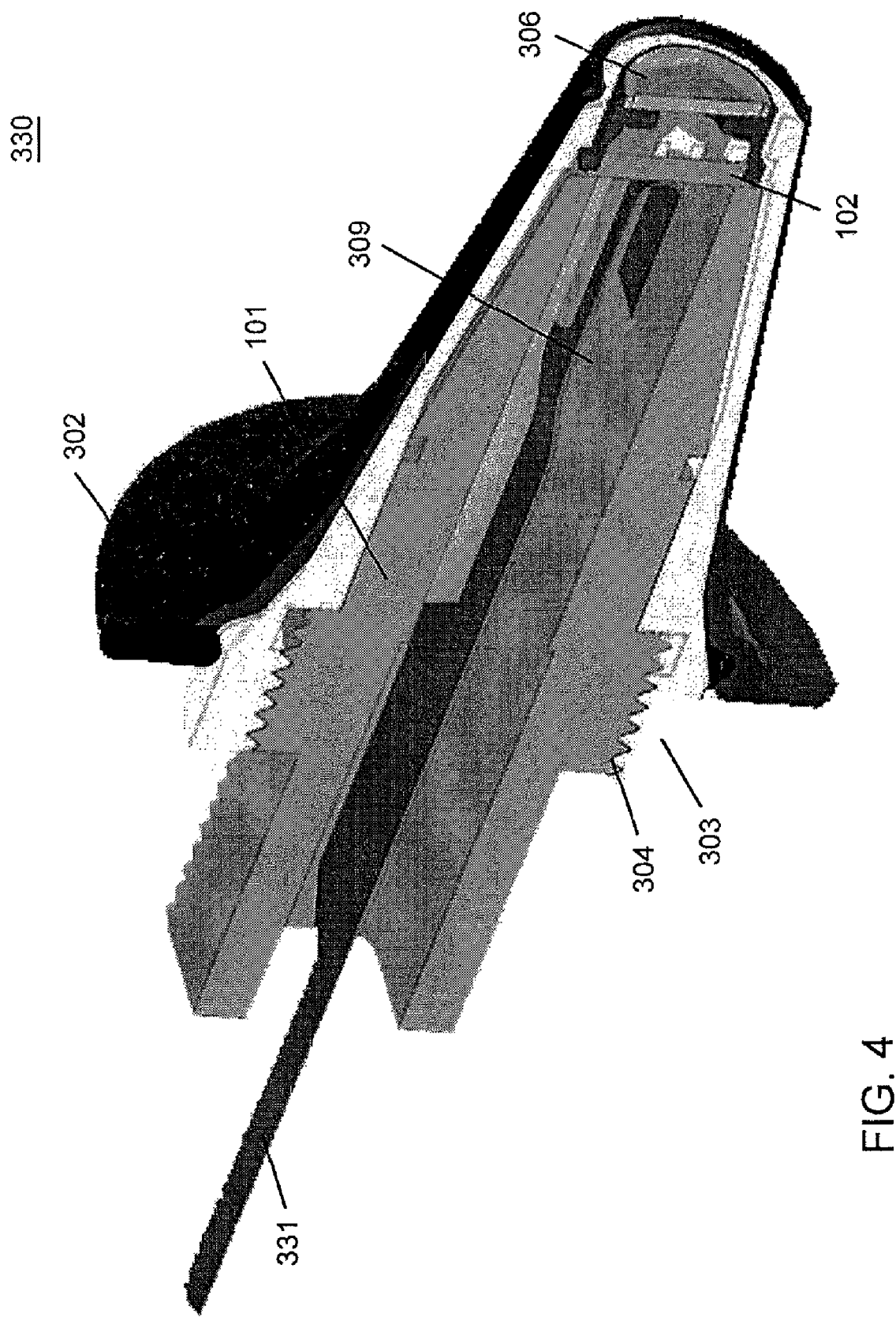
FIG. 4 shows a perspective cutaway drawing of yet another embodiment of a tip assembly.

FIG. 4 shows a perspective cutaway drawing of another embodiment of a tip assembly 330. As in the preceding, the assembly 330 includes a heat sink 101 having a cavity 309 disposed therein and in which a shroud 303 is attached by threading 304 or other means to the tip assembly. A disposable cover to prevent cross-contamination is provided in overlying fashion onto at least the tip portion of the assembly. In the exemplary embodiment of FIG. 4, a semi-flexible or semi-rigid ribbon cable 331 provides electrical connections 107 (FIG. 1). Note that circuit assembly 301 has been omitted from view in FIG. 4 for the sake of simplicity.

Figure 5:
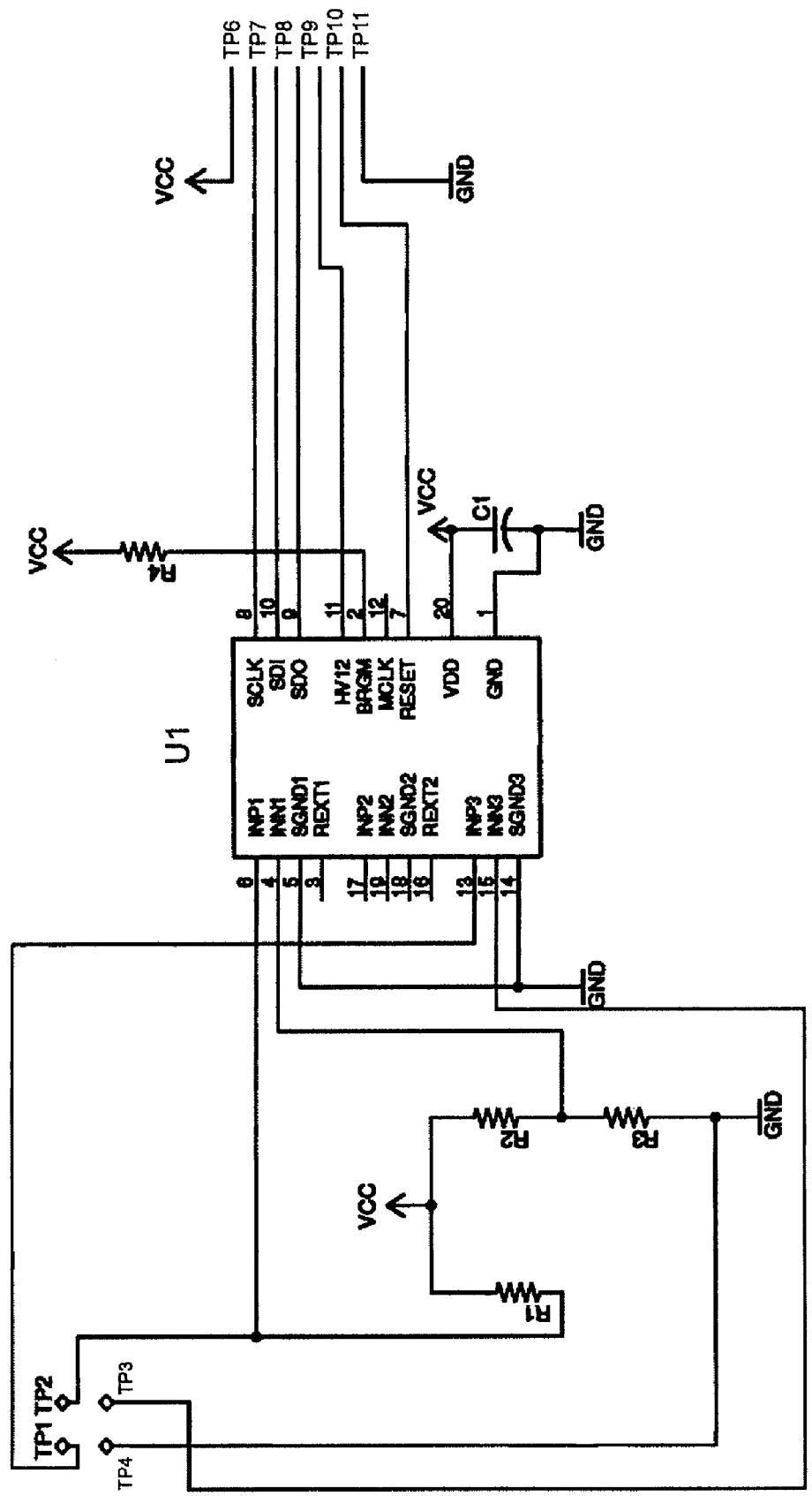
FIG. 5 shows one exemplary schematic diagram of an electronic circuit suitable for use in a tip assembly.

FIG. 5 shows one exemplary schematic diagram of an electronic circuit suitable for use in one embodiment of a tip assembly.

Parts List for FIG. 5
R1 2 Mega ohm
R2 27 kilo ohm
R3 1.2 kilo ohm
R4 100 kilo ohm
C1 0.01 uf
U1 ZMD21013

An IR sensor 102, FIG. 1, such as a TPS 23B thermopile sensor (available from PerkinElmer Optoelectronics, Fremont, Calif.) can be electrically wired in a conventional manner to input connection points TP1, TP2, TP3, and TP4. Resistors R1 to R3 provide bias to IR sensor 102, FIG. 1, as well as an offset voltage at the junction of R2 and R3 for U1. U1 is a commercially available sensor interface integrated circuit, such as are manufactured by ZMD AG, Dresden, Germany. C1 is a standard filter capacitor. R4 is a digital pull up resistor to put U1 into a bridge mode configuration.

Figure 6:
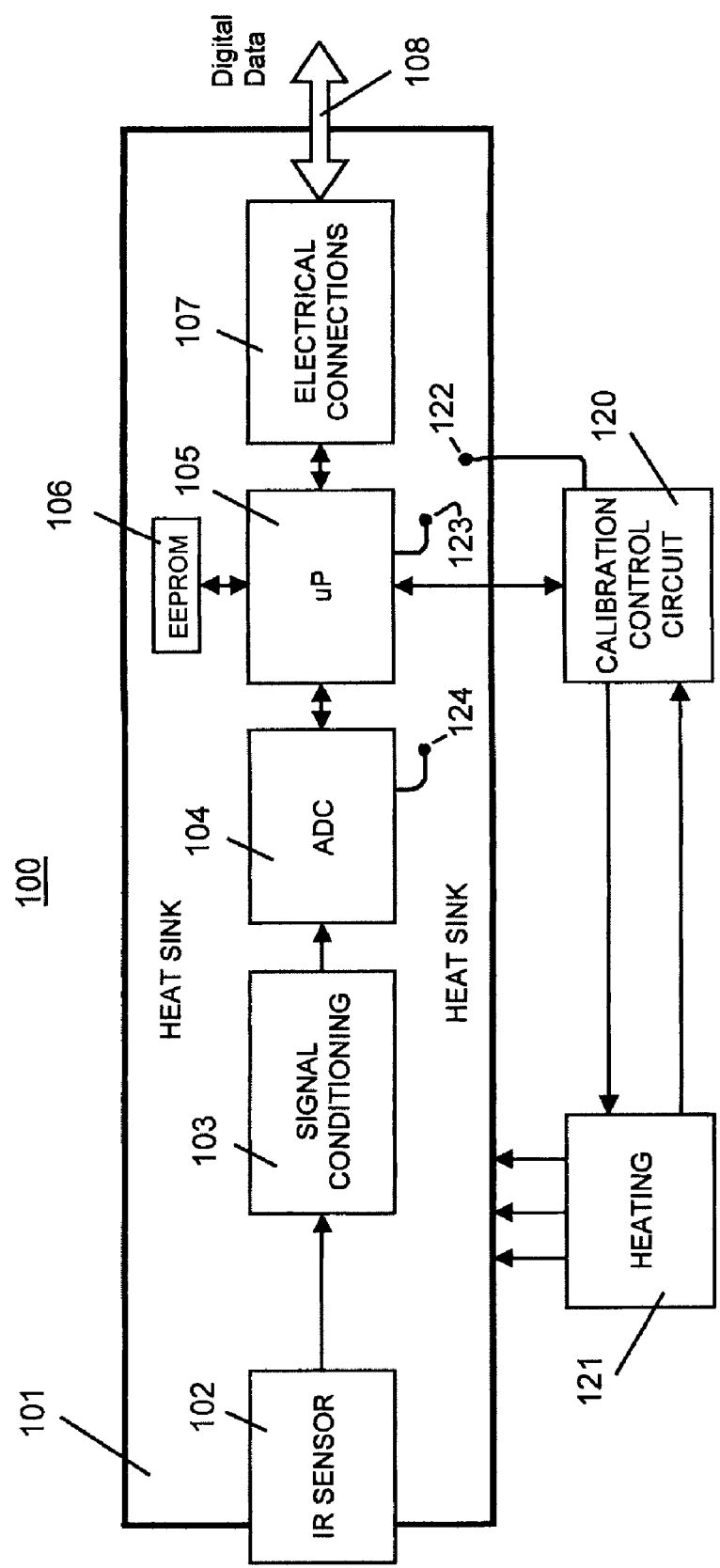
FIG. 6 shows a block diagram of a tip assembly including a heating element.

In another embodiment, a calibration heat source can be included within and as part of a tip assembly 100. FIG. 6 shows a block diagram of a tip assembly 100 having a heating element 121 which can be used to apply thermal energy to heat sink 101. As in the preceding, the heat sink 101 is defining a heat sink cavity wherein the heating element 121 is thermally coupled to heat sink 101. An IR sensor 102 is mechanically seated in the tip section (e.g. as in FIG. 2) of the tip assembly 100 and thermally coupled to heat sink 101. A shroud can mechanically cover at least the tip section of tip assembly 100 (not shown in FIG. 6). An electrical connector (not shown in FIG. 6) can be mechanically disposed in the heat sink 101, or more typically, an electrical connection can be made, for example, by a ribbon cable mechanically coupled to the tip assembly. The connector or connection (e.g. a ribbon cable with a connector or exposed contacts) can be configured to provide electrical connections 107 to tip assembly 100. The temperature of heat sink 101 can be set to set to one or more pre-determined temperatures by heating element 121 during calibration of the tip assembly 100. Heating element 121 can be controlled by a calibration control circuit 120. Calibration control circuit 120 can receive information regarding the temperature of heat sink 101 from a temperature sensor 122. Alternatively, calibration control circuit 120 can receive information from a temperature sensor 123 electrically coupled to a microcomputer 105 having a connection for temperature sensor. Where a microcomputer has an internal ADC, temperature sensor 123 can be any type of suitable analog temperature sensor, or temperature sensor 123 can include an internal ADC and temperature sensor 123 can be in digital communications with microcomputer 105. In other embodiments, ADC 104 can be a multichannel ADC having an input for a temperature sensor 124 to read the temperature of heat sink 101. With temperature feedback information from a temperature sensor such as temperature sensors 122, 123, and/or 124, calibration control circuit 120 can set the temperature of heat sink 101 to a desired temperature during a calibration event. Also, during a calibration event, IR sensor 102 can be mechanically positioned to view an IR calibration target (not shown in FIG. 6) such as a black body calibration target, at one or more temperatures at generally two or more heat sink 101 temperatures.

Figure 7:
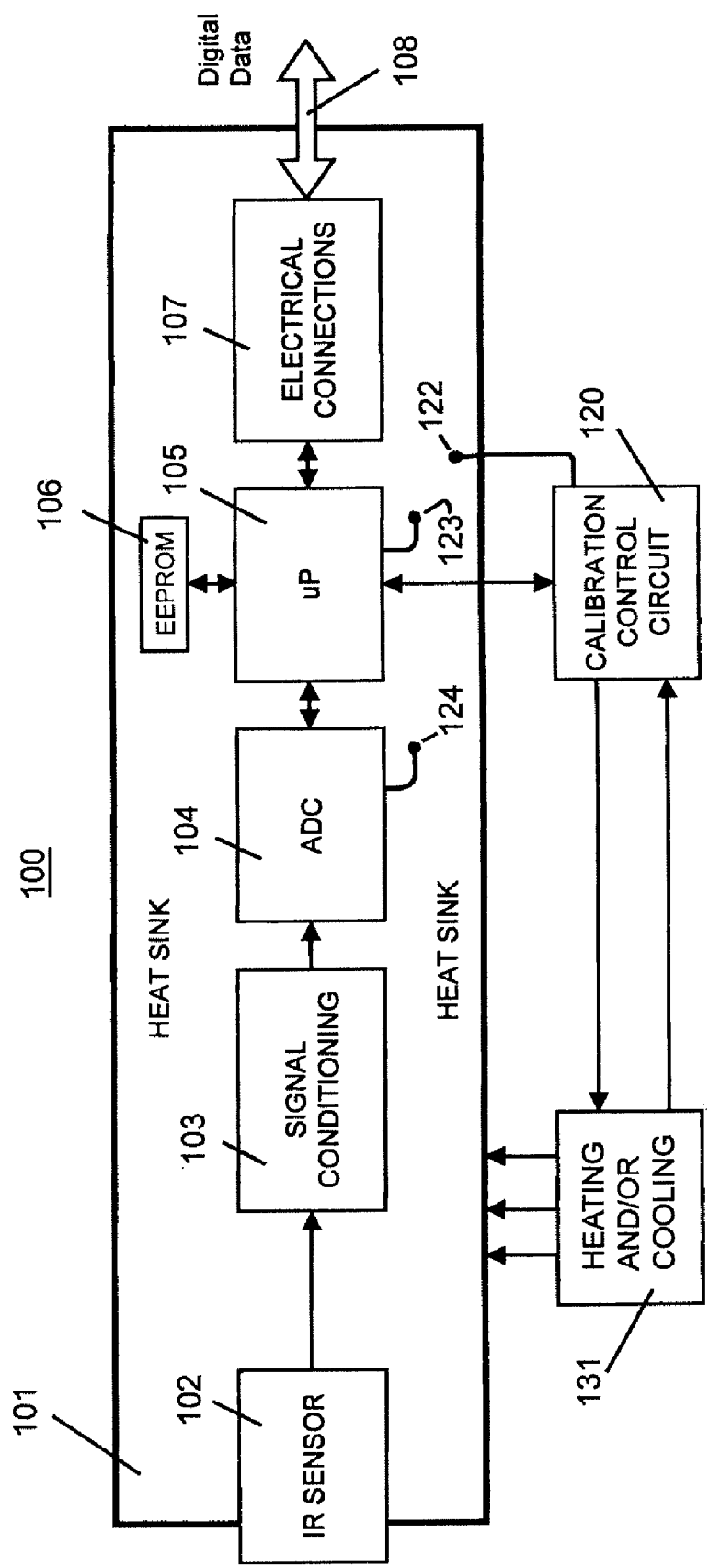
FIG. 7 shows a tip assembly including a thermoelectric heat pump.

In another embodiment, as shown in FIG. 7, heating element 121 can be replaced by a heating and cooling element 131, such as a thermoelectric heat pump (e.g. a Peltier assembly) which can heat or cool heat sink 101. In the embodiment of FIG. 7, the temperature of heat sink 101 can be raised above an ambient temperature or cooled below an ambient temperature during a calibration event. That is, the temperature of heat sink 101 and can be set to one or more pre-determined temperatures by heating or cooling caused by, for example, a thermoelectric heat pump, while IR sensor 102 is viewing one or more IR calibration target temperatures during calibration of a tip assembly 100. A heating and cooling element 131 can have a surface (not shown in FIG. 7) that is compatible with an exposed mating surface on a heat sink 101 to serve as a source side for a heat pump during heating or as a sink side for a heat pump during cooling. Any suitable outer surface of a tip assembly can be used for such heat transport to or from (into or out of) a heating and cooling element 131, such as a heat pump. For example, any threads or threading on an outer surface of a tip assembly (e.g. threads for attaching a threadedly attached shroud) can be used as a suitable path for heat flow into or out of a tip assembly, such as a tip assembly 100, 310, 320, or 330.

A tip assembly, in any of the embodiments as described above, can be used in an IR thermometer, such as an IR ear thermometer. Such an IR thermometer can include a calibrated tip assembly. A microcomputer circuit can be communicatively coupled to the calibrated tip assembly via an electrical connection mechanically coupled to the tip assembly (e.g. a semi-flexible ribbon cable with exposed contact fingers). The microcomputer circuit can run an algorithm configured to receive a digital signal via the electrical connection that represents a measured temperature and to communicate with memory in the tip assembly to read one or more calibration coefficients and to output a measured temperature. The tip assembly can be affixed to an IR thermometer housing any of the mechanical methods described above (e.g. a rotating nut on the IR thermometer housing that can draw in a mechanical thread on a tip assembly). Once the tip assembly and IR thermometer housing are electrically and mechanically coupled to each other (i.e. installation of a calibrated tip assembly is complete), and assuming a charged battery or other suitable source of power, the IR thermometer is in a calibrated state and ready for use. The IR thermometer housing can also include a human readable display, such as a small LCD screen. In some embodiments, the IR thermometer can relay measurement data, such as to a computer or computer network, either using a wired data connection or wireless data connection.

There can be some variation in how computing steps are divided between a tip assembly and a mating apparatus (e.g. an IR thermometer housing). For example, as described above, the tip assembly can output uncorrected "raw" temperature data as well as calibration coefficients. Or, in other embodiments, a microcomputer within the tip assembly can correct raw data and output a digital representation of the actual measurement temperature, without need for further correction by a microcomputer in the mating instrument section. In still other embodiments, a microcomputer or associated circuit in the tip assembly can include a display driver circuit, such as an LCD driver, to directly drive a display in the mating instrument (e.g. in cases such as an IR ear thermometer, where the mating IR thermometer housing has a display). It is unimportant how computing power is distributed between a tip assembly and a mating apparatus, as long as recorded calibration coefficients are used to provide an end result of a calibrated measurement, using calibration coefficients associated with that tip assembly.

Figure 8:
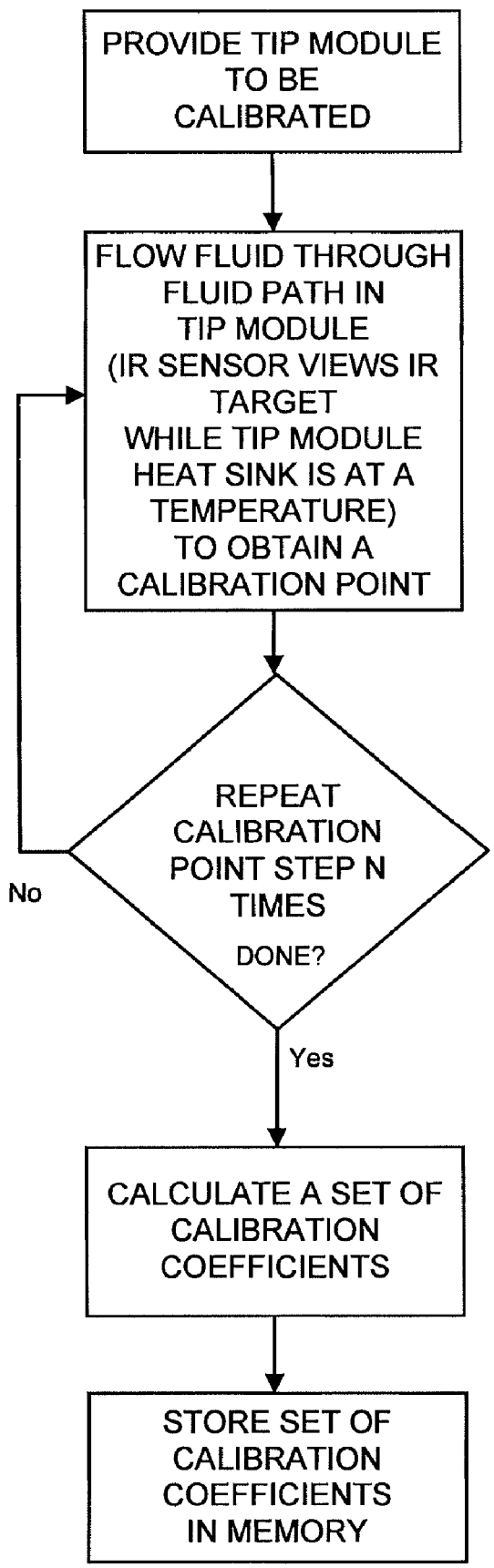
FIG. 8 shows a flow chart of one embodiment of a method to calibrate a tip assembly.

Calibration of a tip assembly is now described in more detail. With reference to FIG. 8, by way of an example, first a tip assembly 100 to be calibrated is provided. The tip assembly 100 as previously described typically includes an IR sensor, a heat sink thermally coupled to the IR sensor, and at least one fluid path, such as an air gap between a heat sink and the tip assembly housing (e.g. a tip assembly shroud), or in some embodiments a channel 111, as shown in FIG. 1 and described above, can provide a suitable fluid path. In other embodiments, an air gap can provide a volume through which a temperature controlled fluid can be flowed, such as an air gap surrounding (in part or in full) a heat sink 101. For example, a tip assembly having an air gap 305 between a heat sink and an overlaying shroud can include at least one hydraulic port which permits a fluid flow though the air gap 305. A fluid at a pre-determined temperature can be caused to flow into and/or through the fluid path (e.g. an air gap or a channel) while the IR sensor of the tip assembly is viewing a calibrated temperature target at a pre-determined target temperature. A calibration data point can be obtained at each heat sink temperature and IR target temperature. A set of calibration coefficients can be calculated from two or more calibration data points. The set of calibration coefficients can be determined, either by a microcomputer in the tip assembly or by an external computer. Once calculated from two or more calibration points, the set of calibration coefficients can be stored in any suitable non-volatile memory in each tip assembly, such as in an EEPROM 106 (FIG. 1).

As a heat sink is brought to various pre-determined temperatures by a temperature controlled fluid and while the IR sensor is viewing an IR calibration target at one or more pre-determined IR target temperatures, data can be acquired for each calibration point (e.g., at a specific heat sink temperature and at a specific IR target temperature). Then, from two or more such calibration data points, a set of calibration coefficients can be derived. While ultimately, the set of calibration coefficients can be written to a suitable type of non-volatile memory in the tip assembly, it is unimportant which computer calculates the set of calibration coefficients. For example, in some embodiments, a test fixture and computer dedicated to a tip assembly calibration process can receive calibration data points from a tip assembly being calibrated, typically by a hardwired connection via an electrical connection (e.g. electrical connection 107, FIG. 1). The computer in the calibration test stand can then compute the set of calibration coefficients from two or more calibration data points and write the set of calibration coefficients to a non-volatile memory in the tip assembly, such as to writable memory in a microcomputer (e.g. microcomputer 105, FIG. 1) or to other suitable memory in a tip assembly, such as EEPROM 106, FIG. 1.

Alternatively, a microcomputer resident in a tip assembly (e.g. microcomputer 105, FIG. 1) can be set in a calibration mode to run a calibration program such as can be present in firmware disposed within a tip assembly. The tip assembly can receive calibration information, such as fluid temperature and IR target temperature, and then calculate the set of calibration coefficients from two or more calibration points. As an alternative to receiving fluid temperature information, a tip assembly can measure its own heat sink temperature (e.g. using temperature sensors 122 and/or 123, FIG. 1). Following calculation of a set of calibration coefficients, the microcomputer can then store the set of calibration coefficients to any suitable non-volatile memory disposed within the tip assembly using any suitable method.

While the present invention has been particularly shown and described with reference to the preferred mode as illustrated in the drawing, it will be understood by one skilled in the art that various changes in detail may be affected therein without departing from the spirit and scope of the invention as defined by the claims.

We claim:

1. An IR thermometer apparatus having a tip assembly, said tip assembly comprising:
    a tip section defined by a heat sink having a cavity, a fluid path defined within said tip section, and at least one hydraulic port;
    an IR sensor disposed within said tip section and thermally coupled to said heat sink; a shroud overlaying at least said tip section;
    an electrical connector configured to provide electrical coupling to an electronic circuit disposed within said tip assembly, wherein a fluid having a fluid temperature is introduced into said fluid path via said at least one hydraulic port, and wherein said fluid causes said heat sink and said IR sensor to substantially reach one or more pre-determined temperatures by thermal conduction during calibration of said tip assembly and wherein said fluid is substantially removed after calibration;
    a cover detection mechanism to detect attachment of a calibration cover, said calibration cover comprising a reflective surface over a window of said IR sensor; and
    a heating element electrically configured to be heated to a predetermined temperature on detection of placement of said calibration cover on said tip assembly, and wherein the reflective surface over the window of the IR sensor reflects IR radiation from said heating element, said received IR radiation being used as a calibration check of said tip assembly.

2. The tip assembly of claim 1, wherein said fluid path comprises a hydraulic channel extending through heat sink.

3. The tip assembly of claim 1, wherein said fluid path comprises an air gap.

4. The tip assembly of claim 3, wherein said air gap is disposed between said heat sink and said shroud.

5. The tip assembly of claim 1, wherein said at least one hydraulic port includes both an inflow connection and an outflow connection configured to allow a fluid flow through said fluid path.

6. The tip assembly of claim 1, wherein said tip section includes two hydraulic ports, wherein a first hydraulic port is configured for fluid inflow and a second hydraulic port is configured for fluid outflow to create a fluid flow through said fluid path and said first hydraulic port and said second hydraulic port are interchangeable for fluid inflow or outflow.

7. The tip assembly of claim 1, wherein said heat sink is thermally isolated from said shroud by at least one air gap.

8. The tip assembly of claim 1, further comprising a memory communicatively coupled to said electrical connector.

9. The tip assembly of claim 8, wherein said memory comprises an EEPROM.

10. The tip assembly of claim 1, wherein said IR thermometer apparatus is configured such that at least once before a temperature measurement is made by said IR thermometer apparatus said calibration coefficients are read from said memory of said tip assembly via said electrical connector by an algorithm running on a microcomputer circuit disposed within said IR thermometer apparatus.

11. The tip assembly of claim 1, further comprising an electronics circuit electrically coupled to said IR sensor, said electronics circuit including an amplifier to amplify an IR sensor signal from said IR sensor, an analog to digital converter (ADC) electrically coupled to said amplifier and configured to digitize an amplified IR sensor signal and to provide an output via said electrical connector.

12. The tip assembly of claim 11, wherein said amplifier and said ADC are both disposed on a common integrated circuit.

13. The tip assembly of claim 11, further including microcomputer resident within said tip assembly wherein said tip assembly is configured such that at least once, said calibration coefficients are read from said memory of said tip assembly by an algorithm running on said tip assembly microcomputer circuit during a measurement and said tip assembly outputs a digital value corrected by said calibration coefficients via said electrical connector.

14. The tip assembly of claim 11, wherein said electronic circuit includes a voltage reference configured to be electrically coupled to said ADC via an electronic switch to calibrate said ADC in response to a control signal sent to said tip assembly via said electrical connector.

15. The tip assembly of claim 14, wherein said microcomputer and said ADC are both disposed on a common integrated circuit.

16. The tip assembly of claim 1, wherein said IR sensor comprises a thermopile.

17. The tip assembly of claim 1, further including an exteriorly disposed threaded portion on said heat sink enabling attachment to attach to said IR thermometer apparatus.

18. The tip assembly of claim 1, further including a slide and latch mechanism enabling attachment of said tip assembly to said IR thermometer apparatus.

19. The tip assembly of claim 1, wherein said tip assembly includes at least one flange enabling mechanical attachment is to said IR thermometer apparatus.

20. The tip assembly of claim 1, wherein said tip assembly comprises a liquid tight housing.

21. The tip assembly of claim 1, wherein if said calibration check is out of pre-determined limits, said calibration coefficients are updated and stored in a memory disposed within said tip assembly.

22. The tip assembly of claim 1, wherein said heating element comprises a thermistor.

23. The tip assembly of claim 22, wherein said thermistor is configured to be used for measuring a heat sink temperature of said IR sensor during a normal operation of said tip assembly, and as a heating element used for calibration during a calibration check of said tip assembly.

24. The tip assembly of claim 1, wherein said cover detection mechanism to detect attachment of said calibration cover comprises at least one of electro-mechanical switch, electro-optical cover detection, and capacitive cover detection.

25. The tip assembly of claim 1, wherein said calibration coefficients are calculated by an external test fixture and written into said memory of said tip assembly during a calibration process.

26. The tip assembly of claim 1, further including an embedded microcomputer.

27. The tip assembly of claim 26, wherein said calibration coefficients are calculated by said embedded microcomputer and written into a memory during a calibration process.

28. An IR thermometer comprising:
a calibrated tip assembly according to claim 1;
a microcomputer circuit communicatively coupled to said calibrated tip assembly via said electrical connector, said microcomputer circuit running an algorithm configured to receive a digital signal representing a measured temperature and to communicate with said memory to read one or more calibration coefficients and to output a measured temperature; and
an IR thermometer housing, said calibrated tip assembly being releasably attached to said IR thermometer housing, and wherein
said IR thermometer is in a calibrated state following attachment of said calibrated tip assembly to said thermometer housing.

29. The IR thermometer of claim 28, wherein said microcomputer circuit is configured to output said measured temperature via at least one of a human readable display, a wired data connection, and a wireless data connection.

30. The IR thermometer apparatus of claim 1, further comprising:
a heat pump thermally coupled to said heat sink;
wherein a temperature of said
heat sink and said IR sensor is set to one or more predetermined temperatures by heating or cooling as caused by said heat pump during calibration of said tip assembly.

31. A tip assembly for an IR thermometer apparatus comprising:
a tip section;
a heat sink disposed in said tip section and having a heat sink cavity;
a heating element thermally coupled to said heat sink;
an IR sensor mechanically seated in said tip section of said tip assembly and thermally coupled to said heat sink;
a shroud mechanically covering at least a portion of said tip section;
a cover detection mechanism to detect attachment of a calibration cover, said calibration cover comprising a reflective surface over a window of said IR sensor; and
an electrical connector configured to provide electrical coupling to an
electronic circuit disposed within said tip assembly, wherein a temperature of said heat sink and said IR sensor is set to one or more pre-determined temperatures by heating caused by said heating element during calibration of said tip assembly, said heating element being electrically configured to be heated to a pre-determined temperature upon detection of placement of said calibration cover on said tip assembly, and wherein said reflective surface reflects IR radiation from said heating element and said received IR radiation is used as a calibration check of said tip assembly.

32. A method to calibrate a tip assembly, said method comprising the steps of:
providing a tip assembly to be calibrated, said tip assembly including an IR sensor, a heat sink thermally coupled to said IR sensor, and at least one fluid path disposed within said tip assembly;
flowing a fluid at a pre-determined temperature though said at least one fluid path while said IR sensor is viewing a calibrated temperature target at a pre-determined target temperature to obtain a calibration data point;
repeating said flowing step one or more times;
calculating a set of calibration coefficients from two or more data points to calibrate said tip assembly; and
storing said set of calibration coefficients on a recordable media wherein said tip assembly is liquid-tight and wherein during said flowing step(s), said tip assembly is submerged within a liquid bath.

33. The method of claim 32, wherein said providing step comprises providing a tip assembly wherein said at least one fluid path disposed within said tip assembly comprises a fluid channel.

34. The method of claim 32, wherein said providing step comprises providing a tip assembly wherein said at least one fluid path disposed within said tip assembly comprises an air gap channel disposed between said heat sink and a tip shroud.

35. The method of claim 32, wherein said step of storing said calibration coefficients comprises storing said calibration coefficients on a memory.

36. A method to releasably attach a tip assembly to an apparatus, said method comprising the steps of:
providing a tip assembly to be releasably attached to an apparatus, said tip assembly including an IR sensor, a heat sink thermally coupled to said IR sensor, and at least one fluid path disposed within said tip assembly;
attaching said tip assembly to said apparatus; and
releasing said tip assembly from said apparatus for a selected one of cleaning said tip assembly, replacing said tip assembly, and calibrating said tip assembly, wherein said calibrating step further comprises the step of attaching a calibration cover onto a tip section of said tip assembly, detecting the attachment of said calibration cover, said calibration cover including a reflective surface over a window of said IR sensor, and heating a heating element to a predetermined temperature upon detection of attaching of said calibration cover to said tip assembly such that the reflective surface of said calibration cover reflects IR radiation from said heating element, the IR radiation received being used as a calibration check of said tip assembly.

37. The method of claim 36, wherein said attaching step further comprises attaching a disposable cover to a tip section of said tip assembly.

* * * * *